Dec. 2, 1924.
D. H. CLEEM
SIDE DRAFT REDUCING HITCH FOR PLOWS
Filed July 22, 1922
1,517,710
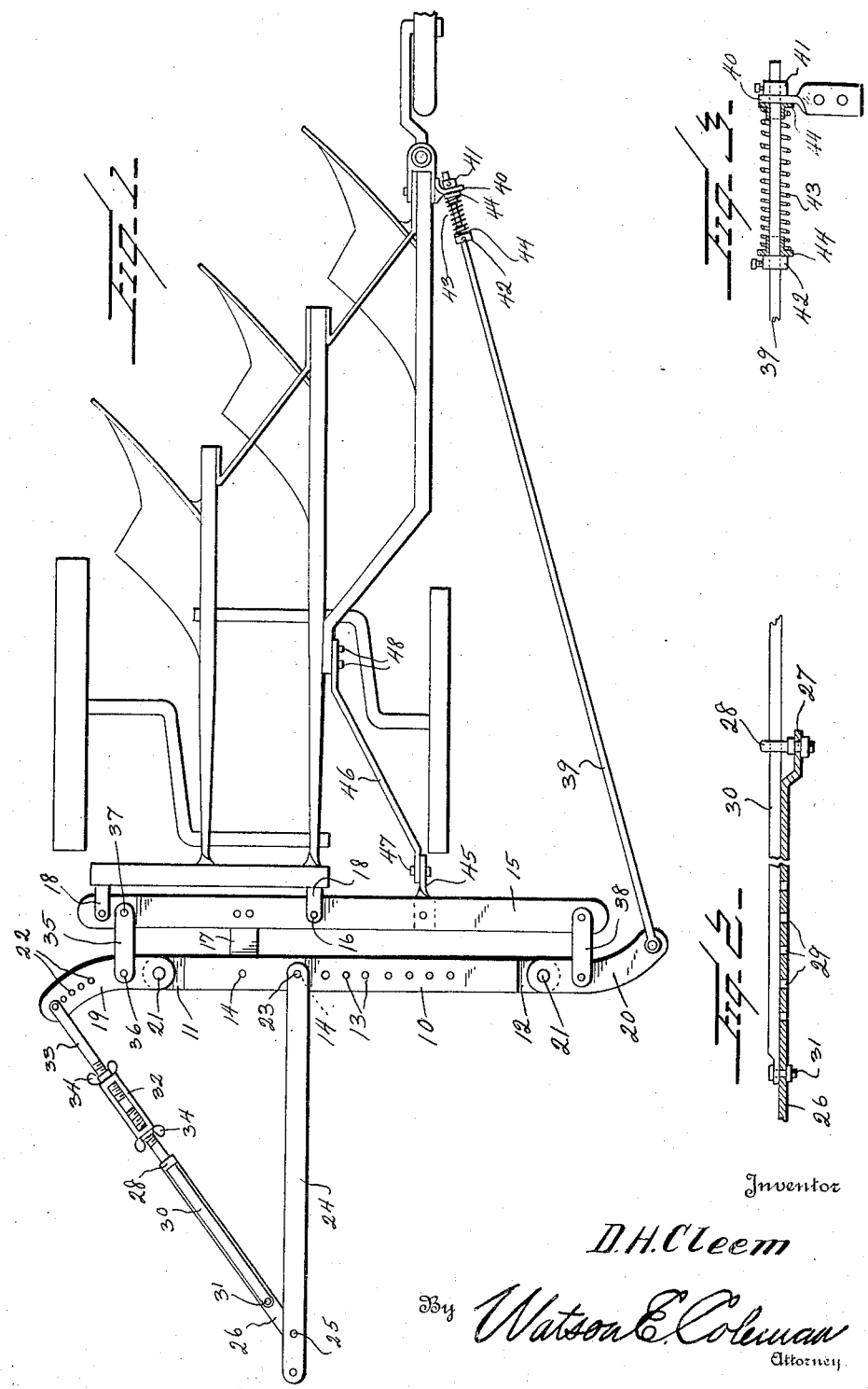

Patented Dec. 2, 1924.

1,517,710

UNITED STATES PATENT OFFICE.

DELPHIA HARRY CLEEM, OF HUMBOLDT, MINNESOTA.

SIDE-DRAFT-REDUCING HITCH FOR PLOWS.

Application filed July 22, 1922. Serial No. 576,728.

*To all whom it may concern:*

Be it known that I, DELPHIA HARRY CLEEM, a citizen of the United States, residing at Humboldt, in the county of Kittson and State of Minnesota, have invented certain new and useful Improvements in Side-Draft-Reducing Hitches for Plows, of which the following is a specification, reference being had to the accompanying drawings.

This invention relates to hitches for agricultural implements, and particuarly to a hitch whereby a plow or like implement may be operatively connected to a tractor.

The general object of the invention is to provide a tractor hitch of this character which will eliminate side draft in the plow without exerting too much of a side draft upon the tractor, and in this connection to provide a hitch which will eliminate all side draft in both plow and tractor when the tractor pulls with one side wheel in the furrow, and which eliminates all but a slight side draft on the tractor when the tractor is run upon the land.

A further object is to provide a device of this character which will increase the efficiency of the plow, which is very simple and easy to adjust, and which has a relatively wide range of adjustment.

A still further object is to provide a hitch which may be readily placed on standard plows without any change in the plow and which can be so adjusted that the plow can be set so that the land side will not rub against the furrow wall at any time, this being particularly characteristic of what is known as a three-furrow automatic plow.

Another object is to provide a tractor hitch of this character which will cause part of the tractor pull to be converted to a thrust against the rear portion of the plow and which keeps the plow running true and the land side from banking against the furrow wall, and further to provide a construction of this character in which this thrust automatically adjusts itself so that the harder the pull, the greater will be the thrust.

Other objects will appear in the course of the following description.

My invention is illustrated in the accompanying drawings, wherein:—

Figure 1 is a top plan view of my improved draft hitch applied to an automatic plow;

Figure 2 is a fragmentary section of the connecting rod parts 26 and 30;

Figure 3 is a detail fragmentary elevation of the rear end of the thrust rod 39, the spring thimbles being in section.

In the accompanying drawings, I have illustrated my device as applied to what is known as an automatic three-furrow plow, but this has been shown diagrammatically and I do not wish to be limited to this form of plow, as by slight changes and adjustments the device may be used on other makes of plows.

Referring first to the construction of the draft device itself, it will be seen that it comprises the transversely extending lever 10. This is under ordinary circumstances about 3' 4" long and may be of half-inch thick flat steel. The opposite ends of this part are off-set, as at 11, and these off-set ends have bolt holes 12. The middle portion of the link 10 is formed with a series of holes 13 which are bored and threaded for half-inch bolts, these holes being approximately 2" apart. Between the series of holes 13 and the off-set portion 11 is a bolt hole 14. Rearward of this lever 10, which extends transversely, is a bar 15 of half-inch flat steel which is approximately 4' 3" in length. One end is provided with an aperture for the passage of a bolt and at its opposite end two bolt apertures. Disposed about two-fifths of the distance from one extremity of the bar 15 is a bolt hole 16. Between this bolt hole 16 and the adjacent end of the bar 15 there is bolted a forwardly projecting iron 17, and a bolt passes through this iron 17 and through the aperture 14, thereby pivoting the member 10 upon the bar 15. Clevises 18 which form part of the plow and are attached to the draw bar thereof are bolted to the bar 15, one at the extremity of the bar and the other intermediate the ends of the bar.

Pivotally connected to the off-set ends 11 and 12 of the lever 10 are the arcuate levers 19 and 20, these arcuate levers being pivoted to the off-set extremities by bolts 21 and the lever 19 having a plurality of bolt holes 22 for adjustment. Pivotally connected to the lever 10 by a bolt 23 which passes through any one of the holes 13 is a draw bar 24 made of flat steel and apertured at its end, whereby it may be connected to the draw bar of the tractor. Pivotally connected by a bolt 25 at a point adjacent the outer end of the draw bar 24 is a flat steel rod 26. One end of this rod is off-set, as at 27, and passing through it is an I-bolt 28. The intermediate portion of the rod is formed with a plurality of bolt apertures 29.

Coacting with this flat steel rod 26 is a rod 30, one extremity of which is formed with an eye for the passage of a bolt 31, the other extremity being screw-threaded. This rod passes through the I-bolt 28. The screw-threaded end of the rod engages with a turnbuckle 32 and this turnbuckle is engaged with a screw-threaded rod 33 having an aperture at its extremity. Locking nuts 34 are disposed on the screw-threaded portions of the rods 30 and 33 and engage at opposite ends of the turnbuckle. It will thus be seen that the parts 26, 30 and 33 constitute in effect a sectional rod connecting the forward end of the draw bar 24 with the arcuate lever 19, this connecting rod being adjustable longitudinally by adjusting part 26 with relation to the part 30 and further adjusting the parts 30 and 33 further from each other by means of the turnbuckle 32.

The lever 19 is pivotally supported by means of a link 35 which is pivoted by a bolt 36 to the arcuate lever 19 and by a bolt 37 to the bar 15 adjacent one end and adjacent the clevis 18. The lever 20 is likewise pivotally supported by means of a supporting link 38 which is pivoted to the lever at one end and to the adjacent end of the bar 15. Pivoted to the lever 20 at its extremity and extending rearward and inward therefrom is a rod 39 which is operatively connected to the plow by the bolt that holds the rear furrow wheel casting. To this end the rear end of the rod 39 passes through a clip 40 having bolt holes whereby it is bolted to the furrow wheel casting and the rear extremity of the rod 39 carries a stop collar 41 having a set screw whereby it may be held in adjusted position. The rod 39 also carries a stop collar 42, and disposed between these stop collars is a coiled compression spring 43, one end of this spring operatively bearing against the eye of the clip 40, while the other end of the spring bears against the collar 42. This collar 42 is adjustable by means of a set screw. Preferably the extremities of the springs are supported by thimbles 44 which bear respectively against the stop collar 42 and against the clip 40 and which support the spring in spaced relation to the rod 39. Bolted to the bar 15 is a twisted clip 45, and attached to this clip is an angular bar 46 which is pivotally connected by a bolt 47 to the clip 45 and at its opposite end is provided with a plurality of bolt holes whereby it may be bolted by bolts 48 to the plow by the bolts that hold the third plow beam to the second plow beam.

It will be seen that this hitch is adjustable to a relatively large variety of conditions and through a relatively wide range. The draw bar 24 is adjustable to connect by means of the bolt 23 with any one of the openings 13, while the rod section 33 is adjustable in any one of the openings in the lever 19. Furthermore, the effective length of the connection between the lever 19 and the forward extremity of the draw bar 24 may be adjusted. The device is easily placed on a plow without any changes in the plow. It is fastened to the plow draw bar by the usual clevises and member 46 is bolted to the plow by the bolts that hold the third plow beam to the second plow beam. This part 46, it will be seen, is practically pivoted to the clip 45 for vertical oscillation. The clip 40, as before stated, is attached to the plow by the bolts that ordinarily hold the furrow wheel casting in place. The coiled spring 44 takes up all sudden jars and keeps the plow from throwing the furrow on account of these sudden jars.

With this hitch, the plow can be so set that the land side will not rub against the furrow wall at any time. This is particularly necessary in three-furrow plows where the side draft of the plow acts to swing the gang with the plows against the land furrow wall. It will be seen that with this construction part of the tractor pull on the draft bar 24 and on the member connecting the forward end of the draft bar 24 with the lever 19 is converted to a thrust against the rear end of the third beam of the plow, and it is this thrust which automatically adjusts itsef for the reason that the harder the pull, the harder the lateral thrust, and this keeps the plow running true and the land side from banking against the furrow wall.

In actual operation it has been found that this hitch eliminates the side draft in the plow without causing too much side draft on the tractor. When the tractor is pulling the plow with one drive wheel in the furrow, all side draft under both plow and tractor is eliminated, but when the tractor is running upon the land there is a slight side draft of the tractor.

It will be seen that it is the pull of the tractor which is converted into a thrust through the levers and links upon the rear end of the plow which keeps the plow pulling straight and the levers and links keep the draw bar in such position that the plow always follows straight. My device also keeps the furrow wheel from banking against the furrow wall because when the land side banks, the furrow wheel banks and vice versa.

I claim:—

1. A hitch for connection to agricultural implements comprising a supporting bar adapted to be connected to the forward end of the implement and extend transversely thereof, a lever extending approximately parallel to the supporting bar and pivotally supported thereon adjacent one end, a pair of levers mounted one at each end of the first named lever and pivotally supported upon the extremities of the supporting bar, a draw bar pivoted to the first named lever, a rod connecting the forward end of the draw bar to one of said second named levers, and a rod connecting the rear end of the implement to the other of said second named levers.

2. A hitch for connection to agricultural implements comprising a supporting bar adapted to be connected to the forward end of the implement and extend transversely thereof, a lever extending approximately parallel to the supporting bar and pivotally supported thereon adjacent one end, a pair of levers mounted one at each end of the first named lever and pivotally supported upon the extremities of the supporting bar, a draw bar pivoted to the first named lever, a rod connecting the forward end of the draw bar to one of said second named levers, and a rod connecting the rear end of the implement to the other of said second named levers, the first named rod being adjustable as to length.

3. A hitch for connection to agricultural implements comprising a supporting bar adapted to be connected to the forward end of the implement and extend transversely thereof, a lever extending approximately parallel to the supporting bar and pivotally supported thereon adjacent one end, a pair of levers mounted one at each end of the first named lever and pivotally supported upon the extremities of the supporting bar, a draw bar pivoted to the first named lever, a rod connecting the forward end of the draw bar to one of said second named levers, and a rod connecting the rear end of the implement to the other of said second named levers, the first named rod being adjustable as to length, the last named rod having a yielding connection to the implement.

4. A hitch for connection to agricultural implements comprising a supporting bar adapted to be connected to the forward end of the implement and extend transversely thereof, a lever extending approximately parallel to the supporting bar and pivotally supported thereon adjacent one end, a pair of levers mounted one at each end of the first named lever and pivotally supported upon the extremities of the supporting bar, a draw bar pivoted to the first named lever, a rod connecting the forward end of the draw bar to one of said second named levers, a rod connecting the rear end of the implement to the other of said second named levers, the first named rod being adjustable as to length, means for connecting the last named rod to the implement comprising a clip mounted upon the implement and through which the rod passes, spaced stops mounted upon the rod on each side of the clip, and a coiled compression spring disposed between the forward stop and said clip.

5. A hitch for connection to agricultural implements comprising a supporting bar adapted to be connected to the forward end of the implement and extend transversely thereof, a lever extending approximately parallel to the supporting bar and pivotally supported thereon adjacent one end, a pair of levers mounted one at each end of the first named lever and pivotally supported upon the extremities of the supporting bar, a draw bar pivoted to the first named lever, a rod connecting the forward end of the draw bar to one of said second named levers, a rod connecting the rear end of the implement to the other of said second named levers, the first named rod being adjustable as to length comprising a rod section pivotally connected to the forward end of the draw bar and having an I-bolt at its opposite end and formed with a plurality of longitudinally aligned perforations, a second rod section passing through the I-bolt and having a bolt at one extremity passing through one of said perforations, and a third rod section connected to the adjacent lever and connected to the second named rod section by means of a turnbuckle.

In testimony whereof I hereunto affix my signature.

DELPHIA HARRY CLEEM.